United States Patent [19]

Haga et al.

[11] 4,274,774

[45] Jun. 23, 1981

[54] TOOL-FITTING DEVICE

[75] Inventors: Minoru Haga; Kunio Kondo, both of Toyota, Japan

[73] Assignees: Toyota Jidosha Kogyo Kabushiki Kaisha; Fujiseiko K.K., both of Japan

[21] Appl. No.: 907,208

[22] Filed: May 18, 1978

[51] Int. Cl.³ .................... B23B 31/06; B23C 5/28
[52] U.S. Cl. ............................ 409/232; 279/1 A; 279/93; 408/239 R
[58] Field of Search ............... 90/11 A; 408/112, 239, 408/239 A; 279/1 A, 9 R, 93; 403/349; 409/231, 232, 234

[56] References Cited

U.S. PATENT DOCUMENTS

| | | | |
|---|---|---|---|
| 699,366 | 5/1902 | Bowes, Jr. | 279/93 X |
| 1,332,898 | 3/1920 | Hossie et al. | 279/9 R |
| 1,892,739 | 1/1933 | Smith | 279/93 |
| 1,975,877 | 10/1934 | Thomas | 279/93 |
| 2,092,060 | 9/1937 | Gairing | 279/93 |

FOREIGN PATENT DOCUMENTS 86064  8/1920  Switzerland ..................... 403/349

Primary Examiner—Z. R. Bilinsky
Attorney, Agent, or Firm—Oblon, Fisher, Spivak, McClelland & Maier

[57] ABSTRACT

Tool-fitting device characterized in that a clamp socket is fixed at the bottom of a hole bored in the spindle; a tool-fitting body with a clamp piece at one end is placed over the clamp socket; and through the connection of the clamp socket and the clamp piece, the rotation of the body caused by the cutting torque is restrained, the cutting thrust is borne, and pull-out is prevented; and through connection of a rotation-restraining engaged members which is restrained in rotation relative to the spindle and the rotation-restraining engaging member which is restricted in rotation relative to tool-fitting body, rotation of the tool-fitting body in a pull-out direction is restrained.

3 Claims, 24 Drawing Figures

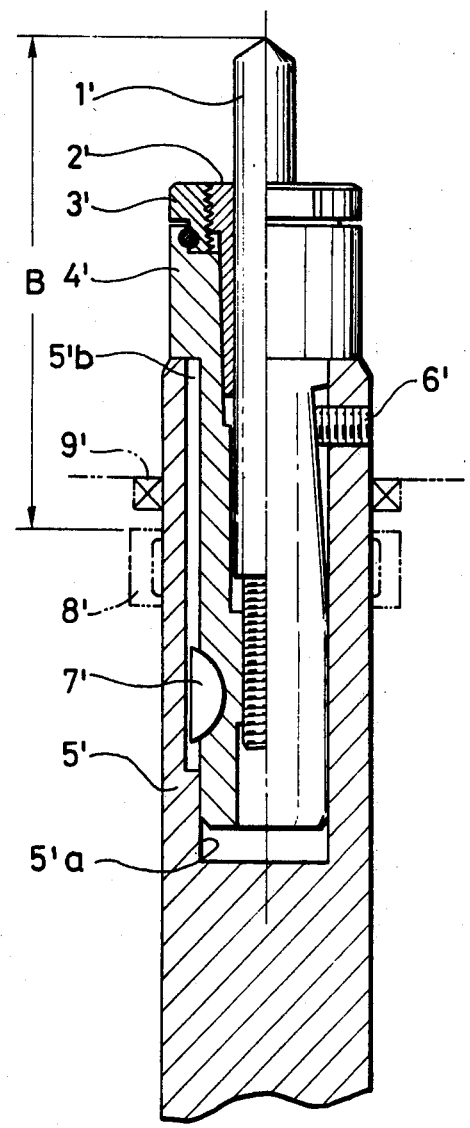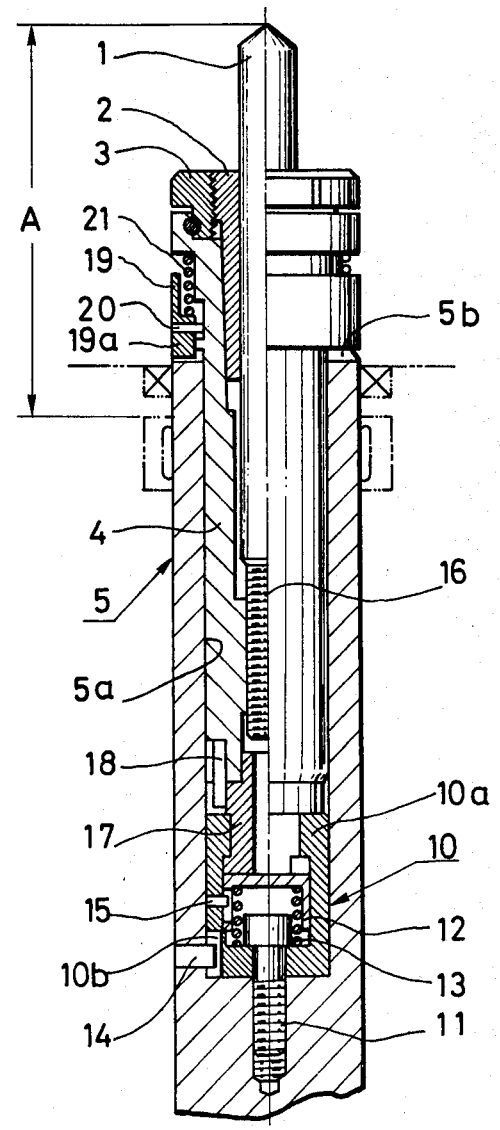
FIG.1 PRIOR ART
FIG.2

FIG.7     FIG.8     FIG.9
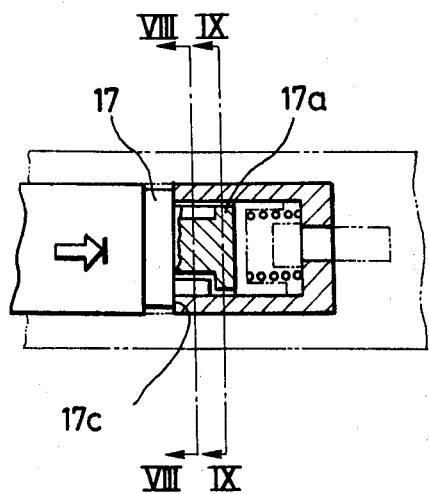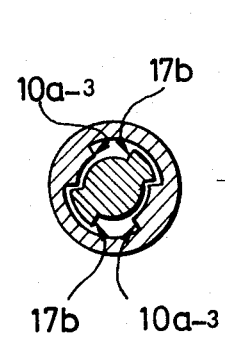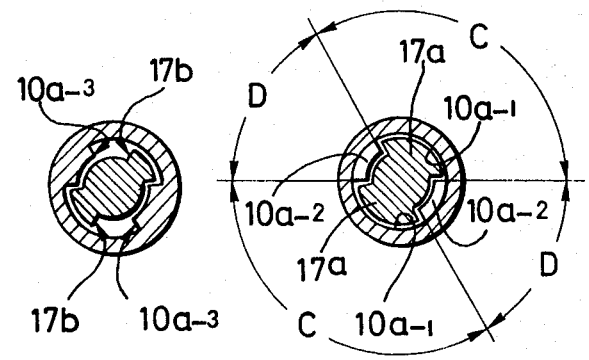
FIG.10     FIG.11     FIG.12
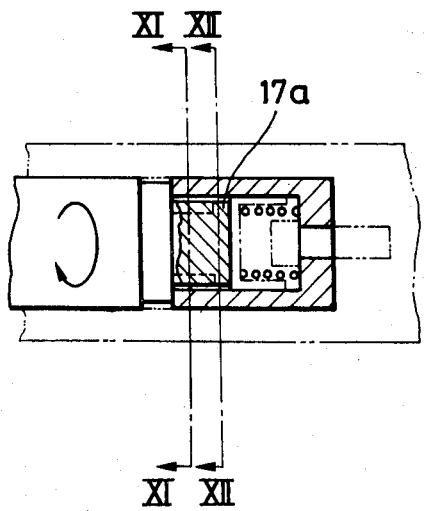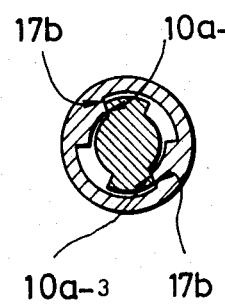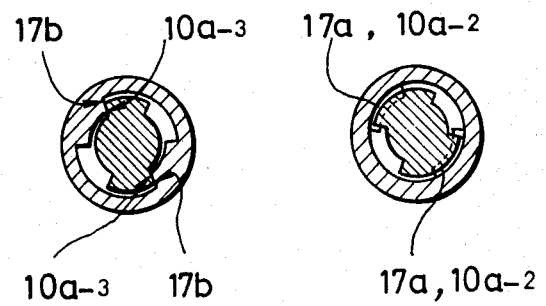

TOOL-FITTING DEVICE

BACKGROUND OF THE INVENTION (1) Field of the Invention:

The present invention relates to a device for fitting a mechanical working tool to a machine.

(2) Description of the Prior Art:

Conventionally a device illustrated in FIG. 1 is employed to fit a tool to the spindle of a machine. Namely, a tool such as a drill 1' is fixed to the tool-fitting body 4' by turning the tightening collar 3' through the collet 2' which is circumferentially split into a number of pieces; the tool-fitting body 4' holding the tool is inserted into the hole or bore 5a' bored in the spindle 5'; and then the tool is fixed to the spindle 5' with the tightening bolt 6' so as not to be pulled out.

In such a conventional device, for the purpose of preventing rotation between the tool-fitting body 4' and the spindle 5' due to the torque acting on the drill 1' in time or working, a key groove 5b' is provided axially on the spindle 5' and a key 7' provided on the outside of the tool-fitting body 4' engages said groove 5b'. Meanwhile, for the purpose of preventing an axial sliding of the tool-fitting body 4' relative to the spindle 5' or pull-out of body 4', a screw hole is bored on the side surface of the spindle 5' at a position beyond the bearing 8' and the oil seal 9' of the machine; a tightening bolt 6' is screwed into said screw hole and thus the tip of the bolt is pressed against the outside of the tool-fitting body 4'.

Such a construction has the drawback of taking considerable time and skill for tightening the bolt 6' and engaging the key 7' in fitting the tool-fitting body 4' holding a drill 1' to the spindle 5' of the machine. Particularly when a number of tools are to be fitted to the machine at the same time, the time required for fitting the tools makes one of the important factors impeding efficient work. Since the spindle 5' has to be provided with the key groove 5b', the part of the spindle 5' where hole is to be bored must have its thickness that correspondingly increased, which results in widening the distance to the adjacent tool and making it impossible to perform a simultaneous working of a site narrower than this distance. Thus the workable range of the machine is limited. Moreover, the distance from the outer end of the bearing 8' to hold the spindle 5' to the tip of the drill, i.e., the overhang B has to be extended to permit installation of the tightening bolt 6', with the result that the tip of the tool becomes liable to oscillate.

SUMMARY OF THE INVENTION

The object of the present invention is to provide a tool-fitting device which can be attached to the machine in a one touch action and can dispense with the conventional bother of fixing by means of a tightening bolt, thereby shortening the time for fitting the tool.

Another object of the present invention is to provide a tool-fitting device in which the wall thickness of the spindle hole is reduced by eliminating the key groove and the tool gap is shortened, thereby widening the workable range of the machine.

Still another object of the present invention is to provide a tool-fitting device in which the overhang for tool fixture is reduced by eliminating the tightening bolt, thereby stabilizing the tool with respect to oscillation.

BRIEF EXPLANATION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a partial lateral section view of the conventional tool-fitting device.

FIG. 2 is a partial lateral section view of one embodiment of the present invention.

FIG. 7 is a section view illustrating the engagement of the clamp piece with the clamp socket in FIG. 2.

FIG. 8 is a section view along VIII—VIII of FIG. 7.

FIG. 9 is a section view along IX—IX of FIG. 7.

FIG. 10 is a section view illustrating the clamp piece as turned and fixed in FIG. 9.

FIG. 11 is a section view along XI—XI of FIG. 10.

FIG. 12 is a section view along XII—XII of FIG. 10.

DESCRIPTION OF THE PREFERRED EMBODIMENTS

Referring to FIGS. 2 to 12, one embodiment of the present invention is to be described.

Figure 3:
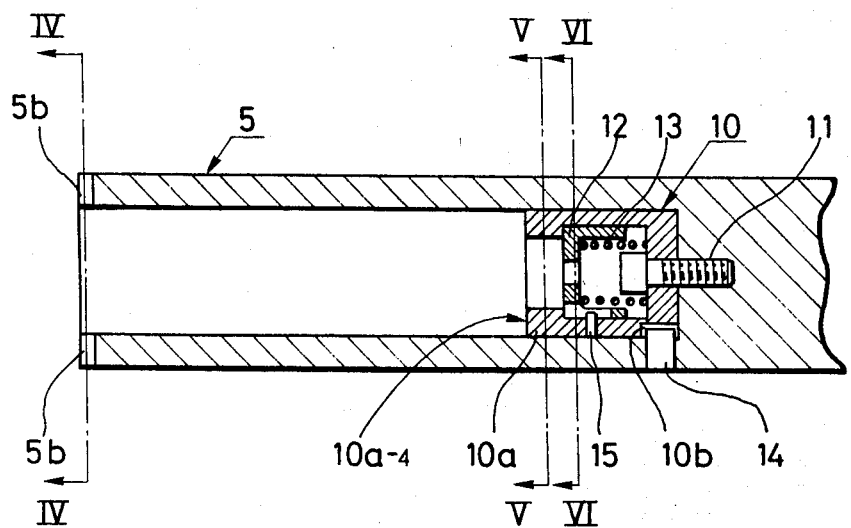
FIG. 3 is a section view illustrating the attached state of the clamp socket in FIG. 2.
Figure 4:
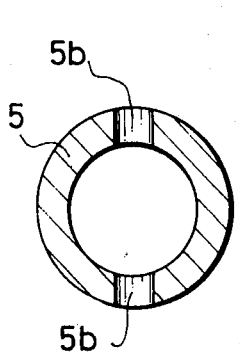
FIG. 4 is a section view along IV—IV of FIG. 3.
Figure 5:
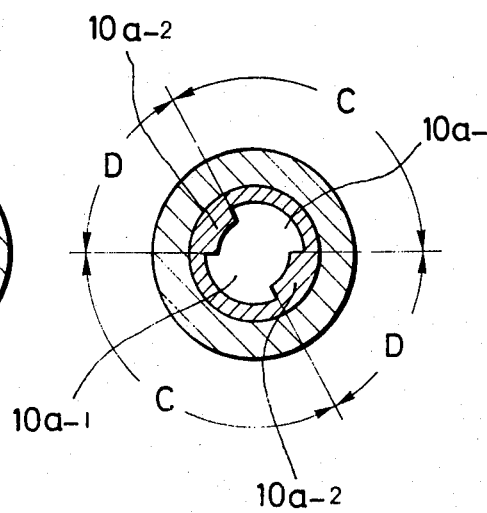
FIG. 5 is a section view along V—V of FIG. 3.
Figure 6:
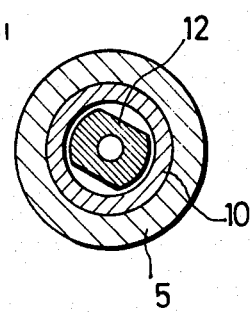
FIG. 6 is a section view along VI—VI of FIG. 3.

In FIG. 2 showing a whole section of the device, at the outer end of the spindle 5 with an axial hole or bore 5a and a bottom surface portion, there is provided at least one groove, i.e., an engaged means 5b for restraining the rotation in a pull-out direction of the tool-fitting device (see FIGS. 3, 4).

The engaged means 5b, if the engaging means 19a of the switch collar 19 to be described later is a convex protrusion, will be a groove as illustrated in the present embodiment; and if the engaging means 19a is a groove, then it will be a projection. Other modes of engagement, for instance, a boss and a hole, may be used.

At the bottom of the hole 5a in spindle 5 a clamp socket 10 is fixed by, say, bolting. Therefore the bottom of the spindle hole 5a is provided with a screw hole to receive a bolt 11. On the inside wall of the spindle hole 5a there is installed a pin 14 for setting the angular position of the clamp socket 10 in the circumferential direction of the spindle hole, at a definite angular position in the circumferential direction of the spindle relative to groove 5b. The pin engages the positioning groove 10a provided in the clamp socket 10b. The clamp socket 10 is normally held in a fixed state to the bottom of the spindle hole 5a, being frictionally pressed against the seat by the bolt 11 in the condition of being fixed in the position relative to the groove 5b on the spindle end by means of the pin 14; and in the upper part there is installed an engaged means 10a which performs three functions of restraining the tool-fitting body in its rotation due to the cutting torque, bearing the cutting thrust, and preventing the body from being pulled out in the axial direction.

The engaged means 10a has an anti-pull-out part 10a-2 which protrudes radially inward of two clamp sockets. Meanwhile, the clamp piece 17 to engage the engaged means 10a has an integral anti-pull-out part 17a which consists of an axial rib and a circumferential rib which extends circumferentially from the tip of said axial rib.

The engaged means 10a, as illustrated in FIG. 9, in the angular range C allows the anti-pull-out part 17a for the clamp piece 17 to pass through its large-diameter portion 10a-1. However, after passage of the part 17a, when the clamp piece 17 is rotated in the same direction as the cutting torque, the circumferential rib of the part 17a will engage the inside surface of the anti-pull-out part 10a-2 of the clamp socket, thereby preventing the pull-out of the piece 17; and at the same time the rotation due to the cutting torque is restrained at the position where the rotation of the clamp piece 17 is arrested (that is, at the position in FIG. 8 where the side surface 17b of the axial rib of the anti-pull-out part 17a of the clamp piece comes to contact the side surface 10a-3 of the anti-pull-out part 10a-2 of the clamp socket 10). The cutting thrust acting on the clamp piece 17 is borne by the longitudinal reference plane 17c of the clamp piece being pressed against the longitudinal reference plane 10a-4 of the clamp socket 10.

Within the clamp socket 10 there is provided a spring cover 12 which is urged by the spring 13, the cover 12 serving to push the clamp piece 17 out of the spindle hole 5a when the anti-pull-out part 17a for the clamp piece 17 is located in the large-diameter portion 10a-1 of the clamp socket 10.

The spring cover 12 is provided with a flat, smooth portion 12a on the outer surface so as to be able to fit within the clamp socket 10. After the spring cover 12 is assembled within the clamp socket 10, the spring cover 12 is rotated so that the anti-pull-out part 10a-2 of the clamp socket 10 may be able to act as a stopper, whereby the force of the spring 13 can prevent the piece from being displaced out of the clamp socket 10. For this purpose, the piece is set in the clamp socket 10 at a position not be displaced out of it, and then the circumferential position is fixed by means of the positioning pin 15.

Figure 13:
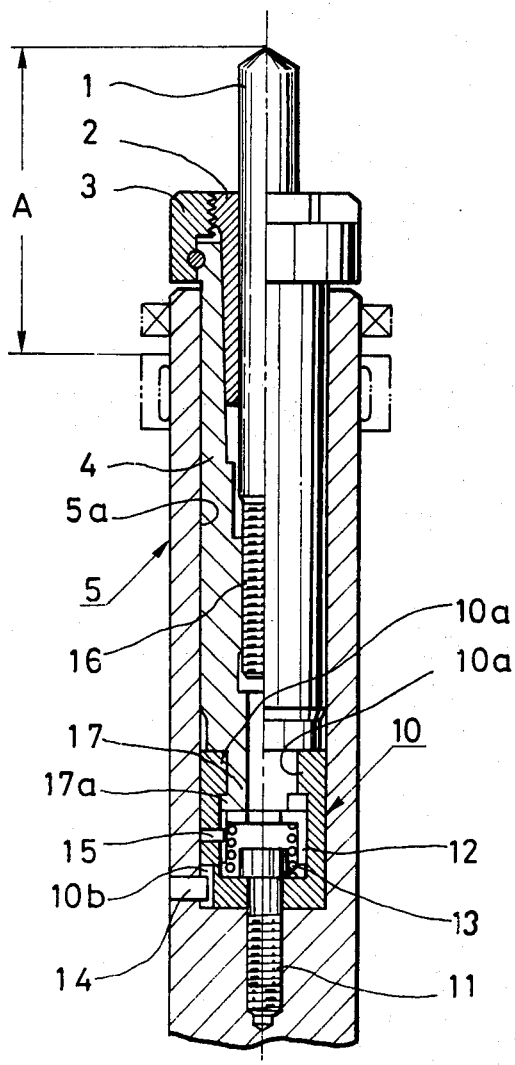
FIG. 13 is a partial lateral section view of another embodiment of the present invention.

The tool-fitting body 4 serves to hold, say, a drill 1 and dismountably fit it into the spindle hole 5a. Usually for working, only the body 4 and a tool held in it are fitted or unfitted; and the clamp socket 10 remains fitted to the spindle 5 of the machine. Fitting of a drill 1 to body 4 is usually done using a collet 2 with a plurality of axial slits and a tightening collar 3, as illustrated in FIG. 2, but other methods, for instance, bolting, may be used instead. The drill 1 has its jutting length from the body 4 adjusted by a drill adjusting bolt 16 as shown in FIG. 13, before the body 4 is attached to the spindle 5.

The clamp piece 17 to engage the clamp socket 10 is pressed into the body 4, and fixed by the anti-turning key 18 for the purpose of preventing it from turning in the body 4 and setting its circumferential position relative to the boss 19a of the switch collar 19 to be described later. The clamp piece 17 may be integral to the body 4, but in the present embodiment it is formed separately for convenience of manufacture.

Near the top end of the body 4, the switch collar 19 is fitted by means of a pin 20 to be slidable in relation to the body 4 but not to be rotatable with respect to each other, and urged toward the spindle 5 by means of a spring 21. In attaching the body 4 to the spindle 5, when the clamp piece 17 is inserted into the clamp socket 10 in the angular range C, the switch collar 19 is lifted in an opposite direction to the spindle 5 while compressing the spring 21; and thereafter when the body 4 is turned to bring the rotation stopper 17b of the clamp piece into contact with the rotation stopper 10a-3 of the clamp socket 10, the boss 19a of the switch collar 19 comes to a position of engagement with the groove 5b at the spindle end and, as a result the spring 21 is relaxed, the switch collar 19 is engaged with the spindle 5; and the pull-out turning of the body 4 from the spindle 5 is restrained. Thus the body 4 will not be pulled out from the spindle 5, even when the drill bites or when a pull-out rotation takes place due to the inertia of the spindle being stopped suddenly.

Next, another embodiment of the present invention is to be described referring to FIGS. 13 to 24.

In this embodiment, the means of restraining the rotation of the tool-fitting body to pull out from the spindle is simplified structurally as compared with the one in the first embodiment. In the first embodiment the restraint of pull-out rotation is effected by engagement of the boss 19a of the switch collar 19 with the groove 5b at the end of the spindle 5. In the second embodiment, this is done by engagement of a V-groove at the end of the clamp piece 17 with a V-boss at the clamp socket 10. Thereby the handling is facilitated and the overhang of the drill 1 is shortened. Like parts with similar construction and function are denoted by like symbols in both embodiments and accordingly the description about the second embodiment is partially omitted here.

Figure 14:
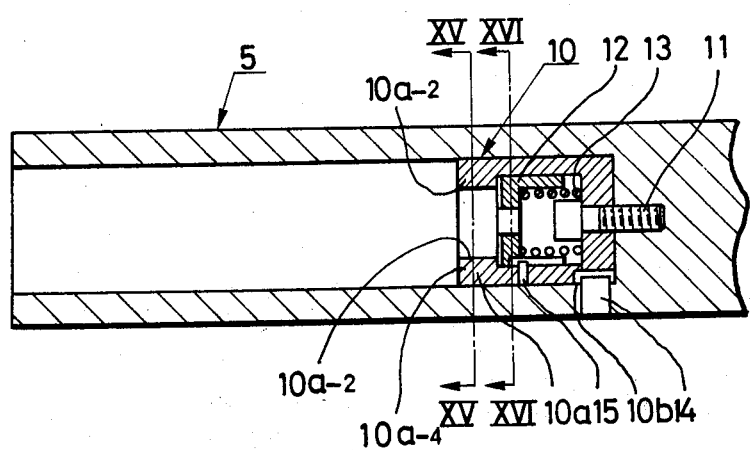
FIG. 14 is a section view illustrating the attached state of the clamp socket in FIG. 13.
Figure 15:
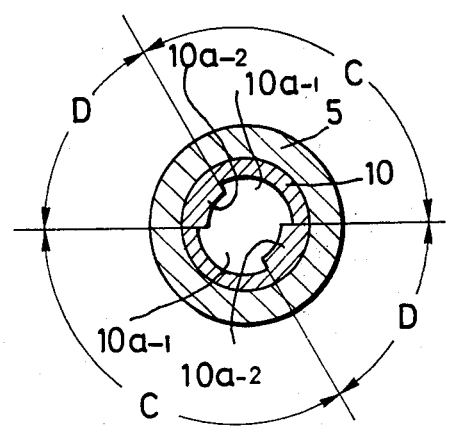
FIG. 15 is a section view along XV—XV of FIG. 14.
Figure 16:
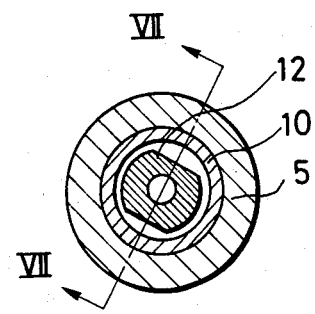
FIG. 16 is a section along XVI—XVI of FIG. 14.

In FIG. 13 the spindle 5 has an axial hole 5a. At the bottom of the spindle hole or bore 5a the clamp socket 10 is fixed with the bolt 11. The clamp socket 10 is restrained in its rotation relative to the spindle 5 by means of the pin 14. At the top of the clamp socket 10, there is formed an engaged means 10a as illustrated in FIG. 14. Just as in the first embodiment, said engaged means 10a performs the three functions of restraining the tool-fitting body 4 in its rotation due to the cutting torque; bearing the cutting thrust; and preventing an axial pull-out.

The clamp socket 10 holds a spring cover 12 which is urged by a spring 13. A positioning pin 15 restrains the rotation of the spring cover 12 within the clamp socket 10.

Figure 17:
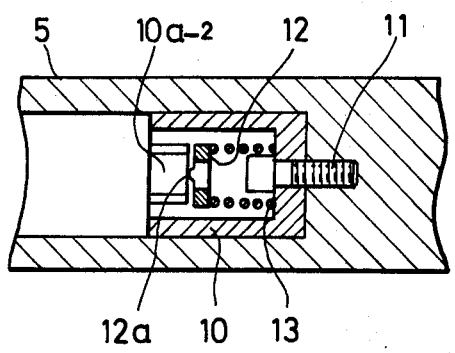
FIG. 17 is a section view along XVII—XVII of FIG. 16.
Figure 18:
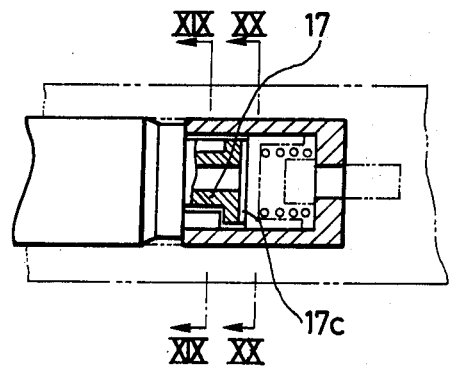
FIG. 18 is a section view illustrating the engagement of the clamp piece with the clamp socket in FIG. 13.
Figure 19:
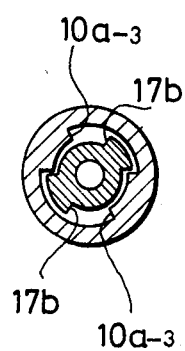
FIG. 19 is a section view along XIX—XIX of FIG. 18.
Figure 20:
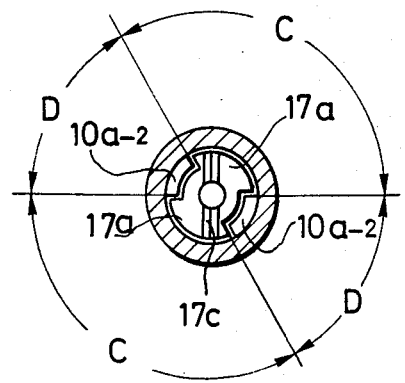
FIG. 20 is a section view along XX—XX of FIG. 18.
Figure 21:
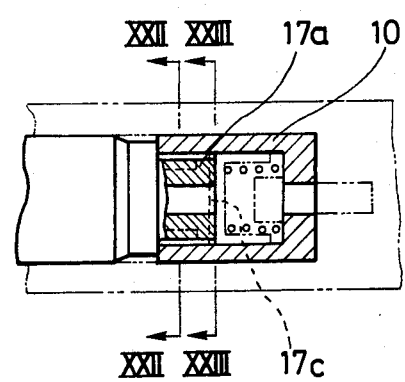
FIG. 21 is a section view illustrating the clamp piece as turned and fixed in FIG. 20.
Figure 22:
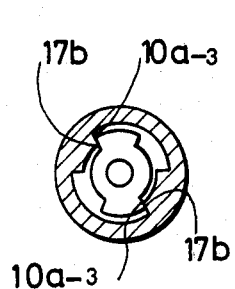
FIG. 22 is a section view along XXII—XXII of FIG. 21.
Figure 23:
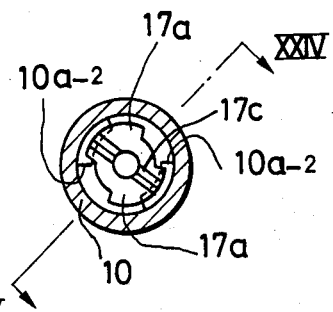
FIG. 23 is a section view along XXIII—XXIII of FIG. 21.
Figure 24:
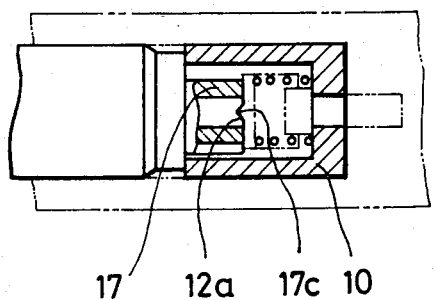
FIG. 24 is a section view along XXIV—XXIV of FIG. 23.

At the top of the spring cover 12 is formed a rotation-restraining engaged member 12a to restrain the pull-out rotation of the body 4. Such means consists of a groove or a boss. FIG. 17 illustrates an example of members 12a formed as a V-boss.

The tool-fitting device attached with a drill 1 by means of a tightening collar 3 is placed in the spindle hole 5a. A clamp piece 17 is fitted to the body 4. Engagement of the clamp piece 17 with the clamp socket 10 is accomplished as in the first embodiment, as seen from FIGS. 19, 22 and 23. Just as in the first embodiment, engagement of the clamp piece 17 with the clamp socket 10 restrains the body 4 in its rotation due to the cutting torque, bears the cutting thrust and prevents a pull-out in the axial direction.

At the bottom of the clamp piece 17 is formed a rotation-restraining engaging member 17c to restrain the pull-out rotation of the body 4. The engaging member 17c is formed in such a configuration as to be able to fit the member 12a, FIGS. 18, 20, 21, 23 and 24 illustrating an example of the member 17c being formed as a V-groove. The circumferential angular relationship between the engaging member 17c and member 12a is such that both means can fit each other when the anti-pull-out part 17a of the clamp piece 17 and the anti-pull-out part 10a-2 of the clamp socket 10 are in engagement with each other.

Thus after the clamp piece 17 pushes the spring cover 12 into the clamp socket 10 against the force of the spring 13 and the clamp piece 17 is turned to bring the engaging member 17c and the engaged member 12a into engagement, such engagement will be maintained by the spring 13 and therefore even if a pull-out rotational force acts on the body 4, the body 4 will not be pulled out with its rotation restrained.

Such being the constitution and function of the present invention, the following effects will accrue from adoption of the tool-fitting device according to the present invention;

(a) Attachment of the tool-fitting device to the spindle is done simply without aid of anything like the wrench, spanner, etc. by inserting into the spindle hole, engaging the clamp piece with the clamp socket, and turning and fixing in the working direction of the cutting torque, to thereby immobilize in the direction reverse to the action of the cutting torque. Thus without the conventional bother of fixing with a tightening bolt, the time required for tool-fitting can be reduced and the work efficiency can be increased.

(b) The wall thickness at the spindle hole can be decreased through elimination of the key groove; and accordingly with the tool gap reduced, the workable range can be expanded.

(c) Elimination of a tightening bolt reduces the overhang of a fitted tool, thereby stabilizing the tool. Moreover in the second embodiment which needs no switch collar the overhang can be further reduced than in the first embodiment.

Obviously, many modifications and variations of the present invention are possible in light of the above teachings. It is therefore to be understood that within the scope of the appended claims the invention may be practiced otherwise than as specifically described herein.

We claim:

1. A tool-fitting device for a tool, comprising:
   a spindle with an axially extending bore having a bottom surface portion;
   a tool-fitting body separate from said tool and said spindle, a clamp piece inserted into said spindle bore, one end of said clamp piece being attached with the tool-fitting body which holds said tool and the other end of said clamp piece including a pair of anti-pull-out parts consisting of an axial rib and a circumferential rib;
   a clamp socket, separate from said spindle, fixed to the bottom of said spindle bore and disposed between said other end of said tool-fitting body and said spindle bottom surface portion, said socket having two anti-pull-out bosses protruding in the radial direction and engaging the anti-pull-out parts of said clamp piece;
   a screw member for decuring said clamp socket to said spindle;
   a rotation-restraining engaged means which is restrained in its rotation relative to said spindle;
   a rotation-restraining engaging means formed at one end of said body and restrained in its rotation relative to said tool-fitting body and, by engaging said engaged means, restrains the rotation of said tool-fitting body with respect to said spindle,
   said engaging means including a switch collar which is axially slideable relative to said tool-fitting body and is spring urged in the direction of said engaged means.

2. The tool-fitting device of claim 1, wherein said clamp piece is integral to said tool-fitting body.

3. Tool-fitting device of claim 1, wherein said engaged means consists of a groove formed at the end of said spindle, while said engaging means consists of a boss which fits into said groove.

* * * * *